United States Patent
Frump et al.

[15] 3,687,888
[45] Aug. 29, 1972

[54] TERPOLYMER LATEX EMULSIONS

[72] Inventors: John A. Frump; Harry F. Kruse, both of Terre Haute, Ind.

[73] Assignee: Commercial Solvents Corporation, New York, N.Y.

[22] Filed: Oct. 30, 1969

[21] Appl. No.: 872,762

[52] U.S. Cl......260/29.7 N, 260/29.7 R, 260/29.7 T, 260/80.7, 260/80.72, 260/80.73, 260/80.78
[51] Int. Cl..............................C08f 1/13, C08f 27/08
[58] Field of Search........260/29.7 R, 29.7 T, 29.7 N, 260/805, 80.72, 80.7, 80.73, 30.4 A, 30.4 N

[56] References Cited

UNITED STATES PATENTS 3,208,981  9/1965  Miranda et al. ..........260/78.5
3,505,297  4/1970  Sheetz et al. .............260/78.4
2,831,858  4/1958  de Benneville et al. ...260/78.5

OTHER PUBLICATIONS

Encyclopedia of Chem. & Tech., 2 Ed., 1,829 (1963) (TP9E68C.3)
Encyclopedia of Poly. Sci. & Tech., 1,865 (1964) (TP156,P6E6)
Kirk, Othmer, Ency. of Chem. Tech. I, p. 830 (1963) (TP9E68C.3)

*Primary Examiner*—Morris Leibman
*Assistant Examiner*—T. DeBenedictis, Sr.
*Attorney*—Howard E. Post and Robert H. Dewey

[57] ABSTRACT

A terpolymer of styrene, butadiene, and a vinyl oxazoline or vinyl oxazoline ester in aqueous emulsion form, useful for the preparation of paper coatings.

9 Claims, No Drawings

TERPOLYMER LATEX EMULSIONS

BACKGROUND OF THE INVENTION

This invention relates to terpolymer latex emulsions in paper coating compositions. In a particular aspect, it relates to terpolymer latex emulsions suitable for coating paper stock.

Styrene-butadiene latex emulsions have many uses, of which two of the most important include the preparation of emulsion paints and paper coatings by the incorporation of pigments and other adjuncts and large volumes are used annually. In products such as these, the copolymer serves as the vehicle to bind the pigments to the substrate. Although highly successful, products of this type present a variety of problems to the formulator and numerous proposals have been made for their improvement. These problems include a need for improved wetting properties of both pigment and substrate, improved pigment dispersion, and maintainance of low viscosity to permit maximum pigment content.

It has been known from the disclosure of R. F. Purcell, U. S. Pat. No. 3,248,397, to prepare drying oils by polymerizing 4,4-substituted 2-(1-ethenyl alkyl or alkenyl)-2-oxazolines with compounds having a terminal $CH_2=C<$ group, e.g. styrene, but terpolymers of these oxazolines with styrene and butadiene have not been previously reported.

SUMMARY OF THE INVENTION

It is an object of this invention to provide terpolymers useful in emulsion coating compositions.

It is another object of this invention to provide polymers and emulsions thereof particularly useful as vehicles in coatings suitable for binding pigments and clay to paper.

Yet another object is to provide coating compositions having high solids content.

Other objects will be apparent to those skilled in the art from the disclosure herein.

It has been discovered that terpolymer latex emulsion compositions are obtained by copolymerizing an oxazoline corresponding to the formula

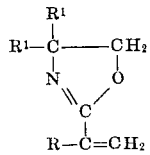

where R is alkyl or alkenyl of from 1–16 carbon atoms or mixtures thereof and $R^1$ is alkyl, hydroxyalkyl, or the group

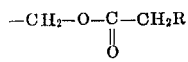

with styrene and butadiene in a latex emulsion system. The resulting emulsified polymer is formulated with pigments, clays and other additives to provide useful coating compositions particularly suitable for coating paper, but not limited thereto.

DETAILED DISCUSSION

The latex emulsion compositions of the present invention are comprised of aqueous emulsions of polymers having from about 45–60% by weight styrene, 20–40% butadiene and 2–20% of an oxazoline corresponding to the above formula and suitable emulsifying agents (or surfactants), therefore, as known in the art. The invention also contemplates paper coating compositions having improved properties formulated with the aforedescribed latex emulsions.

The polymer emulsion, or latex, can be prepared by any suitable method known to those skilled in the art. Preferably, but not necessarily, the polymerization is effected in the presence of an alkanolamine corresponding to the formula

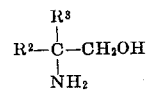

wherein $R^2$ is hydrogen or an alkyl group of one or two carbon atoms and $R^3$ is hydrogen or a methyl radical, in an amount equal to about 0.1–2.0 parts per hundred parts of monomer (phm) and 0.5 phm is particularly preferred. These alkanolamines include, but are not limited to, mono-ethanolamine, 2-amino-2-methyl-1-propanol (AMP) and 2-amino-1-butanol. AMP is particularly preferred. The method used for preparing the products described in the examples is set forth below. The formulation of emulsion paper coatings is generally known to those skilled in the art and the terpolymers of the present invention can be used in place of the previously employed vehicles, e.g. styrene-butadiene copolymers.

The terpolymer latexes of the present invention possess several advantages compared with the styrene-butadiene copolymers of the prior art. The replacement of part of the butadiene results in a whiter, cleaner-looking polymer and appreciably higher concentration of dispersed polymer can be achieved. Also important is that conversions are complete so that none of the monomers are lost due to incomplete reaction. Film of the terpolymers are also less "tacky" than those of the copolymers.

Paper coatings prepared by use of the terpolymer in place of the styrene-butadiene copolymer show the particular advantages of lower viscosity thus permitting higher solids content, either vehicle or pigment content or both, without interferring with high-speed application rates in paper-coating operations. Furthermore they have improved wetting properties and in some instances, better adhesion to hydrophilic surfaces, e.g. glass and metal, and pigment dispersion is improved.

Some of the ethenyl (or vinyl) oxazolines used in the preparation of the terpolymers of the present invention are commercially available and the usual commercial grades are suitable. Others can be prepared according to the method disclosed by Purcell in U.S. Pat. No. 3,336,145. Preferably the oxazolines should be of good color and free from foreign odor. Some grades of ethenyl oxazolines contain substantial amounts of non-ethenylic oxazolines which are unreactive in the polymerization process and hence act as inert diluents. Preferably the ethenyl oxazolines are free from substantial amounts of unreactive impurities. Suitable ethenyl oxazolines include those prepared from saturated or unsaturated fatty acids having from 2–18 carbon atoms, such as acetic, propionic, hexanoic, decanoic, decenyl, lauric, palmitic, oleic, linoleic, linolenic, and stearic.

General Procedure for Preparing Latex

The compositions described in the following examples were prepared by modifying a typical styrene-butadiene latex recipe known in the art and following a typical, known polymerization procedure. A composition prepared as follows was used as a standard of comparison:

| Ingredients | Concentration, parts by wt. |
|---|---|
| Distilled water | 115.0 |
| Potassium persulfate | 0.5 |
| Anionic surfactant | 3.0 |
| Nonionic surfactant | 3.0 |
| n-Dodecylmercaptan | 0.02 |
| Styrene | 60.0 |
| Butadiene | 40.0 |

The anionic surfactant was Siponate DS–10, a linear dodecylbenzene sodium sulfonate marketed by Alcolac Chemical Co., Baltimore, Maryland 21226. The nonionic surfactant was Triton X-100, octyl phenoxy polyethoxy ethanol marketed by Rohm and Haas Co., Philadelphia, Pa. 19105.

Except for the butadiene, the above ingredients were charged to a pressure-resistant glass reaction vessel and cooled to from 0° to −20° C. Gaseous butadiene from a cylinder was liquefied by passing through a cold zone provided by a dry ice-acetone bath and the liquid butadiene was introduced into the reaction vessel, which was then tightly closed and allowed to stand at room temperature for about 30 minutes, and was then placed in a water bath at room temperature and agitated by end-over-end tumbling at about 38 revolutions per minute. The bath was then heated rapidly to about 60° C where it was maintained constant for about 16 hours at which time the polymerization was determined to be complete. The latex prepared by this procedure had a solids content of about 50% by weight.

General Procedure for Preparing Paper Coating

The product obtained by the foregoing procedure was formulated into a paper coating by charging the following ingredients into a suitable vessel:

| | |
|---|---|
| Clay, pigment grade | 90.0 parts by wt. |
| Calcium carbonate, ground | 10.0 |
| Sodium hexametaphosphate | 0.1 |
| Distilled water | 43.0 |

The clay used was Hydrasperse No. 2 marketed by J. M. Huber Corp., Huber, Ga. The calcium carbonate was Purecal 0 marketed by Wyandotte Chemical Co., Wyandotte, Mich.

These ingredients were thoroughly mixed for 15–30 minutes using a Premier Mill Dispersator, then 3 parts of Soya protein (Delta Protein marketed by Central Soya, Chicago, Ill., 60639) dispersed in 13 parts of distilled water were added and mixed for about 5 minutes followed by 0.4 parts of 28% aqua ammonia. This mixture was then heated to about 60° C in about 25 minutes, meanwhile maintaining constant agitation.

There was then added 18.7 parts of the latex, 25 parts of distilled water and the pH was adjusted to 8.3–8.4 as needed with 28% aqua ammonia.

The viscosity of each of the paper coatings prepared as above was determined by known methods and a sample of the coating was drawn down on paper using a Bird Film Applicator to provide a wet thickness of 1.5 mil. The coating was dried for 1 hour in an oven at 50° C and the gloss was measured in a Gardner 60° glossmeter and water resistance was determined by the method of Casey, "Pulp and Paper", Vol. 3, 1961. The results are described in the examples.

EXAMPLES 1–3

Following the general procedure for preparing the latex, three terpolymers were prepared wherein 2-isopropenyl-4-ethyl-4-propionyloxymethyl-2-oxazoline (VOE) replacing varying amounts of styrene and butadiene. The total solids content was 62.5% by wt., by comparison with a commercial "control" latex having 55% total solids. Properties of the latexes so prepared were determined, and paper coatings were then prepared as set forth above. Properties of the coatings were determined and the coatings were then applied to paper as hereinbefore set forth. Gloss and water resistance were then determined. For comparison a control prepared as described above was included in all tests. The following results were obtained (good water resistance is indicated by a low number):

Latex Preparation and Properties

| Ingredients, Parts by wt. | Control | Examples | | |
|---|---|---|---|---|
| | | 1 | 2 | 3 |
| AMP | None | 0.5 | 0.5 | 0.5 |
| VOE | None | 5 | 10 | 15 |
| Styrene | 60 | 60 | 60 | 45 |
| Butadiene | 40 | 35 | 30 | 40 |
| Latex Properties | | | | |
| pH, before* | 4.5 | 10.8 | 10.5 | 10.1 |
| pH, after** | 2.3 | 8.6 | 8.8 | 7.1 |
| Quality of emulsion | Thick Good | Thin Smooth | — Smooth | Thick Smooth |
| Conversion, % | 77 | 100 | 100 | 100 |

*Before adding butadiene
**After polymerization

Paper Coating Properties

| | control | Examples | | |
|---|---|---|---|---|
| | | 1 | 2 | 3 |
| Viscosity at 25°C, cps | 425+ | 1896 | 1868 | 1376 |
| Total solids content, % | 55 | 62.5 | 62.5 | 62.5 |
| pH of coating dispersion | 9.2 | 8.4 | 8.3 | 8.3 |
| Gloss, unbuffed film | 5 | 5 | 6 | 5 |
| Gloss, buffed film | 14 | 14 | 14 | 15 |
| Water resistance of film, unbuffed | 1 | 9 | 3 | 10 |

+A commercial latex was employed

The latex of Examples 1–3, before incorporating in the coating, showed good wettability on glass and steel and good adhesion on steel. However only the latex of Example 3 showed good adhesion on glass.

EXAMPLES 4–5

The experiment of Examples 1–3 was repeated except that 2-isopropenyl-4-hydroxymethyl-4-ethyl-2-oxazoline (VO) was used to replace a portion of the styrene and butadiene. The results obtained were as follows:

| Latex Preparation and Properties | | Examples | |
|---|---|---|---|
| Ingredient, Parts by wt. | Control | 4 | 5 |
| AMP | None | 0.5 | 0.5 |
| VO | None | 5 | 15 |
| Styrene | 60 | 60 | 45 |
| Butadiene | 40 | 35 | 40 |
| Latex Properties | | | |
| pH, before | 4.5 | 11.0 | 10.6 |
| pH, after | 2.3 | 9.3 | 9.4 |
| Quality of emulsion | Thick Good | Thick Smooth | — — |
| Conversion, % | 77 | 100 | 100 |
| Paper Coating Properties | | | |
| Viscosity at 25°C, cps | 425 | 2028 | 1496 |
| Total solids content, % | 55 | 62.5 | 62.5 |
| pH of dispersion | 9.2 | 8.4 | 8.4 |
| Gloss, unbuffed film | 5 | 5 | 6 |
| Gloss, buffed film | 14 | 15 | 15 |
| Water resistance of film, unbuffed | 1 | 6 | 4 |

The latex of Examples 4 and 5, prior to incorporation in the coating, showed good wettability on glass and steel.

EXAMPLE 6

The experiment of Example 1 is repeated in all essential details except that 2-isopropenyl-4-hydroxymethyl-4-methyl-2-oxazoline is used to prepare the terpolymer latex. The resulting latex is employed in a paper coating and gives improved results.

EXAMPLE 7

The experiment of Example 1 is repeated in all essential details except that 2-isopropenyl-4,4-dimethyl-2-oxazoline is used to prepare the terpolymer latex. The resulting latex is employed in a paper coating and gives improved results.

EXAMPLE 8

The experiment of Example 1 is repeated in all essential details except that 2-isopropenyl-4,4-bis-(hydroxymethyl)-2-oxazoline is used to prepare the terpolymer latex. The resulting latex is employed in a paper coating and gives improved results.

EXAMPLE 9

The experiment of Example 1 is repeated in all essential details except that 2-isopropenyl-4,4-bis-(propionylmethyl)-2-oxazoline is used to prepare the terpolymer latex. The resulting latex is employed in a paper coating and gives improved results.

EXAMPLE 10

The experiment of Example 1 is repeated in all essential details except that 2-isopropenyl-4-propionyl- oxymethyl-4-methyl-2-oxazoline is used to prepare the terpolymer latex. The resulting latex is employed in a paper coating and gives improved results.

EXAMPLES 11–15

The latexes of Examples 1–5 were diluted to 55% by weight of total solids to be equivalent to the control and properties were redetermined on the latexes and on coatings and films prepared from them as previously described. The viscosities are noteworthy. The data obtained are as follows:

Properties of Latexes and Films

| | Control | Examples | | | | |
|---|---|---|---|---|---|---|
| | | 11 | 12 | 13 | 14 | 15 |
| pH, after | 2.3 | 8.2 | 8.2 | 8.2 | 8.3 | 8.3 |
| Viscosity, cp | 425 | 354 | 390 | 272 | 356 | 310 |
| Gloss* | 5 | 5 | 5 | 5 | 5 | 5 |
| Gloss** | 14 | 16 | 13 | 17 | 14 | 15 |

*Unbuffed film
**Buffed film

EXAMPLES 16–22

The experiments of Examples 1–5 are repeated except that different vinyl oxazolines are substituted for the vinyl oxazolines previously employed. Good conversions are obtained and the resulting latexes are of low viscosity permitting a high solids content when formulated into coatings. The oxazolines employed are as follows:

Ex. No.
16 2-(1-ethenyl butyryl)-4,4-dimethyl-2-oxazoline
17 2-(1-ethenyl octyl)-4,4-bis(hydroxymethyl)-2-oxazoline
18 2-(1-ethenyl nonenyl)-4,4-bis(hydroxymethyl)-2-oxazoline
19 2-(1-ethenyl undecyl)-4,4-bis(lauroyloxymethyl)-2-oxazoline
20 2-(1-ethenyl tridecyl)-4-methyl-4-palmitoyloxymethyl-2-oxazoline
21 2-(1-ethenyl heptadecenyl)-4-ethyl-4-oleoyloxymethyl-2-oxazoline
22 2-(1-ethenyl heptadecyl(-4-methyl-4-hydroxymethyl-2-oxazoline

EXAMPLE 23

The experiment of Example 1 is repeated in all essential details except that monoethanolamine is substituted for AMP. The latex obtained thereby is employed in a paper coating and gives improved results.

EXAMPLE 24

The experiment of Example 1 is repeated in all essential details except that 2-amino-1-butanol is substituted for AMP. The latex obtained thereby is employed in a paper coating and gives improved results.

We claim:
1. A latex emulsion composition comprising an aqueous emulsion of a terpolymer consisting of copolymerized monomers of styrene 40–60 parts by wt., butadiene 20–40 parts, and 2–20 parts of an ethenyl oxazoline corresponding to the formula

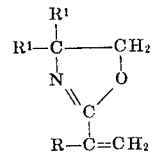

where R is an alkyl or alkenyl group of from 1–16 carbon atoms and $R^1$ is alkyl, hydroxyalkyl, or the group

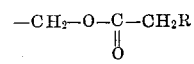

wherein polymerization of said monomer is effected in the presence of about 0.2–2.0 parts per hundred parts of monomers of an alkanolamine corresponding to the formula

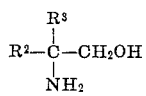

wherein $R^2$ is hydrogen or an alkyl group of one or two carbon atoms and $R^3$ is hydrogen or a methyl radical.

2. A paper coating having as the vehicle the terpolymer of claim 1.

3. The terpolymer emulsion of claim 1 wherein the styrene, butadiene and oxazoline are in a proportion of about 45–60, 30–40 and 5–15 parts by weight respectively.

4. The composition of claim 1 wherein the terpolymer is prepared with an oxazoline wherein $R^1$ is alkyl.

5. The composition of claim 1 wherein the terpolymer is prepared with an oxazoline wherein $R^1$ is hydroxyalkyl.

6. The composition of claim 1 wherein the terpolymer is prepared with an oxazoline wherein $R^1$ is the group

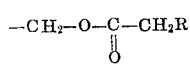

7. A process for the production of an aqueous latex emulsion of an ethenyl oxazoline-styrene-butadiene terpolymer by emulsion polymerization in the presence of n-dodecylmercaptan at a temperature of about 60° C consisting essentially of reacting an ethenyl oxazoline corresponding to the formula

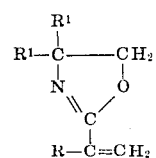

where R is an alkyl or alkenyl group of from 1 – 16 carbon atoms or mixtures thereof and $R^1$ is alkyl, hydroxyalkyl or the group

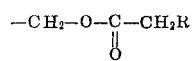

with styrene and butadiene in a ratio of from 2 to about 20 parts by weight of said oxazoline, about 45 to about 60 parts by weight of styrene and about 20 to about 40 parts by weight of butadiene.

8. The process of claim 7 wherein said reaction is conducted in the presence of from about 0.2 to about 2.0 parts of an alkanolamine corresponding to the formula

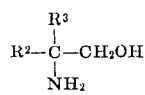

wherein $R^2$ is hydrogen or an alkyl group of one or two carbon atoms and $R^1$ is hydrogen or a methyl radical.

9. The process of claim 8 wherein said alkanolamine is 2-amino-2-methyl-1-propanol.

* * * * *

PO-1050
(5/69)

UNITED STATES PATENT OFFICE
CERTIFICATE OF CORRECTION

Patent No. 3,687,888                     Dated August 29, 1972

Inventor(s) John A. Frump and Harry F. Kruse

It is certified that error appears in the above-identified patent and that said Letters Patent are hereby corrected as shown below:

Column 5, line 49 - "(propionylmethyl)" should be --propionyloxymethyl--.

Column 8, line 30 - "$R^1$" should be --$R^3$--.

Signed and sealed this 6th day of February 1973.

(SEAL)
Attest:

EDWARD M. FLETCHER, JR.
Attesting Officer

ROBERT GOTTSCHALK
Commissioner of Patents